(12) United States Patent
Rettig

(10) Patent No.: US 7,282,815 B2
(45) Date of Patent: Oct. 16, 2007

(54) METHOD AND CIRCUIT ARRANGEMENT FOR MINIMIZING INTERFERENCE IN AN ELECTRONIC CIRCUIT

(75) Inventor: Rasmus Rettig, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 473 days.

(21) Appl. No.: 10/912,678

(22) Filed: Aug. 5, 2004

(65) Prior Publication Data

US 2005/0073794 A1 Apr. 7, 2005

(30) Foreign Application Priority Data

Oct. 1, 2003 (DE) ................................ 103 45 731

(51) Int. Cl.
*H02H 1/00* (2006.01)
(52) U.S. Cl. ........................................................ 307/87
(58) Field of Classification Search .................. 307/87; 341/120
See application file for complete search history.

(56) References Cited

U.S. PATENT DOCUMENTS 4,989,002 A * 1/1991 Tan ............................ 341/120

6,131,453 A * 10/2000 Sultan et al. ............. 73/204.26
6,754,876 B2 * 6/2004 Sasaki et al. ................... 716/1

FOREIGN PATENT DOCUMENTS

| DE | 31 34 322 A1 | 3/1983 |
|----|----|----|
| DE | 44 25 164 A1 | 1/1996 |
| DE | 195 31 386 A1 | 2/1997 |
| DE | 196 03 674 A1 | 8/1997 |

* cited by examiner

*Primary Examiner*—Robert L. Deberadinis
(74) *Attorney, Agent, or Firm*—Michael J. Striker

(57) ABSTRACT

The method and circuit arrangement both minimize stray electromagnetic interference in an electronic circuit, in which symmetric measurement signals are evaluated. Both inputs (InP, InM) of an evaluation circuit (2) are provided with a bank of switchable capacitors ($C_z$) individually or in groups, which are connectable with the respective inputs. A predetermined interference signal is applied to the respective inputs (InP, InM) and individual ones or groups of the switchable capacitors ($C_z$) are selectively connected with the inputs (InP, InM) so that a maximum suppression of the predetermined interference signal can take place. Data regarding the capacitance values selected during the suppression of the predetermined interference signal is stored in the memory (3') of a switching controller (3) during selective switching so that the same adjustment occurs automatically during subsequent operation cycles of the circuit arrangement.

10 Claims, 2 Drawing Sheets

METHOD AND CIRCUIT ARRANGEMENT FOR MINIMIZING INTERFERENCE IN AN ELECTRONIC CIRCUIT

CROSS-REFERENCE

The invention described and claimed hereinbelow is also described in DE 103 45 731.3, filed Oct. 1, 2003. This German Patent Application, whose subject matter is incorporated here by reference, provides the basis for a claim of priority of invention under 35 U.S.C. 119 (a)-(d).

BACKGROUND OF THE INVENTION

1. Field of the Invention

The present invention relates to a method and circuit means or a circuit arrangement for minimizing interference or noise, especially in electronic circuits, which are exposed to stray or scattered electromagnetic radiation, and particularly in which symmetrical measured signals are analyzed or evaluated.

2. Related Art

Generally the requirements for integrated circuits regarding robustness against stray electromagnetic radiation are continuously increasing with concurrent increases in the integration density of these circuits. The foreseeable contingent fixed integration of capacitors of larger capacitance for broadband filtering of electromagnetic interference in circuits leads however to increased costs when small structure widths are used and thus should be avoided.

Amplification and conditioning of signals, especially small signals, is required in circuit applications, especially in sensors. The measurement of the output signal from a Wheatstone bridge circuit in a resistively operating pressure sensor, as described for example in DE 196 03 674.7 A1, is one example of this sort of sensor circuit application.

In this sort of application input signals in a range of a few μV are corrected and amplified by a factor larger than 100. At the same time great robustness against stray or scattered electromagnetic radiation, which can lead to difference signals with insufficient symmetry on the input side of the integrated circuit is required. The amplitude of this stray radiation very closely approaches that of the actual measured variable and thus can impair the functioning of the sensor.

SUMMARY OF THE INVENTION

It is an object of the present invention to provide a method of the above-described type for minimizing electromagnetic interference in an electronic circuit, in which especially symmetric measured signals are analyzed.

It is also an object of the present invention to provide a circuit arrangement or means of the above-described type for minimizing electromagnetic interference in an electronic circuit, in which especially symmetric measured signals are analyzed.

According to the invention the method for minimizing stray electromagnetic interference in an electronic circuit, in which symmetric measurement signals are evaluated, comprises the steps of:

a) providing both inputs of an evaluation circuit with a plurality of switchable capacitances and means for switching them into and out of connection with the respective inputs;

b) applying a predetermined interference signal to the respective inputs; and c) selectively switching individual ones or groups of the switchable capacitances into connection with the respective inputs so that maximum suppression of the predetermined interference signal takes place. The input of the interfering voltage can occur here capacitively, galvanically or by means of a transmitting antenna.

It is especially preferred when data defining the respective selected capacitances for minimizing interference is stored in a memory of a switching controller and subsequently used in subsequent operating cycles to automatically control the switching process. In a simple manner it is possible to select the individual ones or groups of switchable capacitances once during the development of a circuit arrangement. Alternatively the selection of the individual ones or groups of switchable capacitances can occur after the manufacture of the respective circuit arrangements.

The method according to the invention can advantageously be performed in a sensor circuit or sensor measurement cell with a measuring bridge, in which a bridge diagonal voltage is conducted symmetrically to the inputs of the evaluation circuit. Here a simple method of improving the robustness of this sort of circuit is provided in principle by the semi- or fully automatic minimization of the asymmetries, e.g. caused by different conductor lengths or scattering processes, near the integrated circuit and the sensor measurement cell.

The method according to the invention for improving the robustness of the circuit arrangement against stray electromagnetic radiation is thus related to a desired symmetrization of the inputs to the circuit arrangement. An asymmetric termination of the inputs would produce a difference signal, because of differences between the asymmetric conductors or leads with identical propagation of interfering signals on both conductors, i.e. propagation of a so-called common-mode signal. For example in the case of a pressure sensor measurement cell a signal can be produced at the inputs, which should not be different from a true pressure sensor signal, by rectification and integration in the amplifier stage of the circuit arrangement.

The invention avoids the current conventional optimization of the so-called EMV behavior of a sensor by individual tests and as necessary by the use of simulations. Since only a comparatively small statistically scarcely relevant number of circuits are tested and optimized with this conventional method, process variations of the individual components, such as the evaluation circuit, measurement cell or circuit board cannot be corrected. Improvements can be achieved, as mentioned previously, only possibly with the use of additional passive components, which cause increased costs and require additional areas on the circuit board.

A circuit arrangement for performing the above-described method is especially preferred, in which the circuit arrangement comprises an integrated circuit for an evaluation circuit for evaluation of a symmetric measured or sensor signal. In this circuit arrangement a plurality or bank of switchable capacitors are provided at both inputs of the evaluation circuit, which are connectable individually or in groups with one terminal connected to the respective inputs and with another terminal to ground.

Furthermore in a preferred embodiment a controllable circuit arrangement for switching in the capacitors is present, with which the switching or connection of the individual or groups of capacitors is controlled by values or data stored in a memory for providing a controlled capacitance value required to minimize the interference.

In summary it has been shown that a considerably improved EMV optimization is provided with the method and circuit arrangement according to the invention. A required compensation process for each individual circuit arrangement with its associated measurement cell is possible, with which process-dependent asymmetries of the measurement cell, the circuit board and the signal processing circuitry can be compensated.

BRIEF DESCRIPTION OF THE DRAWING

The objects, features and advantages of the invention will now be illustrated in more detail with the aid of the following description of the preferred embodiments of a circuit arrangement for minimizing stray or scattered electromagnetic radiation, with reference to the accompanying figures in which.

DETAILED DESCRIPTION OF THE INVENTION

Figure 1:
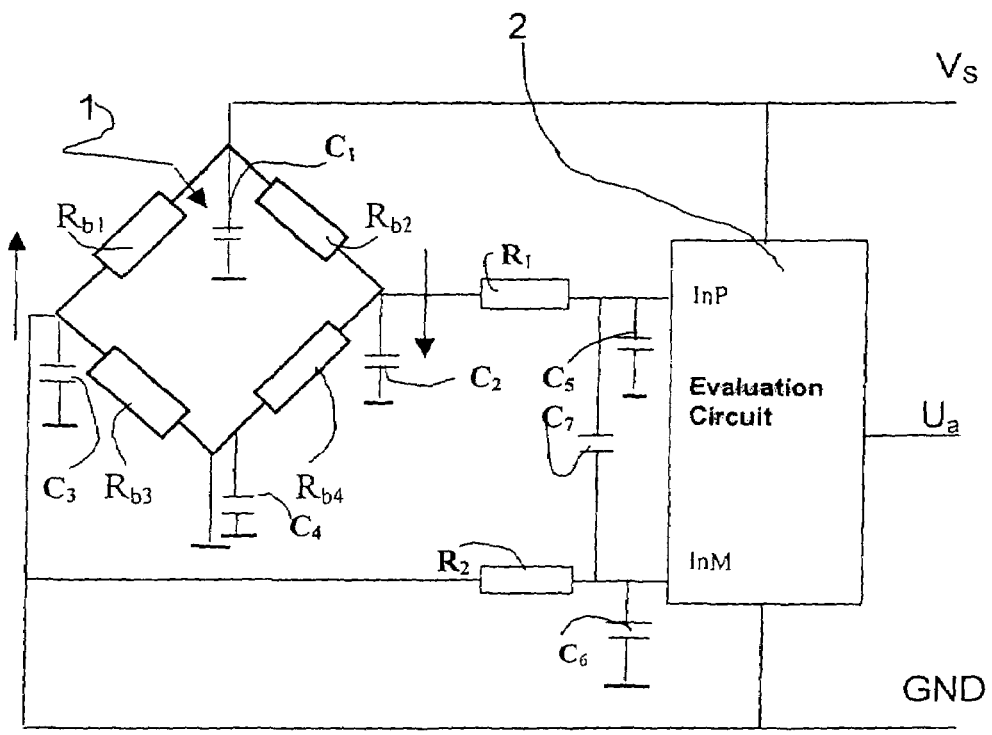
FIG. 1 is a circuit diagram of a sensor arrangement with a pressure-measuring cell and an evaluation circuit.

The sensor arrangement shown in the circuit diagram of FIG. 1 has a pressure measuring cell 1, which comprises a measurement bridge circuit, e.g. a Wheatstone bridge circuit. The measurement bridge circuit has interconnected resistances $R_{b1}$, $R_{b2}$, $R_{b3}$ and $R_{b4}$ and line capacitances $C_1$, $C_2$, $C_3$ and $C_4$. The measurement bridge circuit is connected on one side to a supply voltage $V_s$ and on the other side to ground GND. The measured voltage is extracted by means of resistances $R_1$ and $R_2$ and applied across the inputs InP and InM of the evaluation circuit 2. The line capacitances occurring there are characterized by the capacitances $C_5$, $C_6$ and $C_7$.

Figure 2:
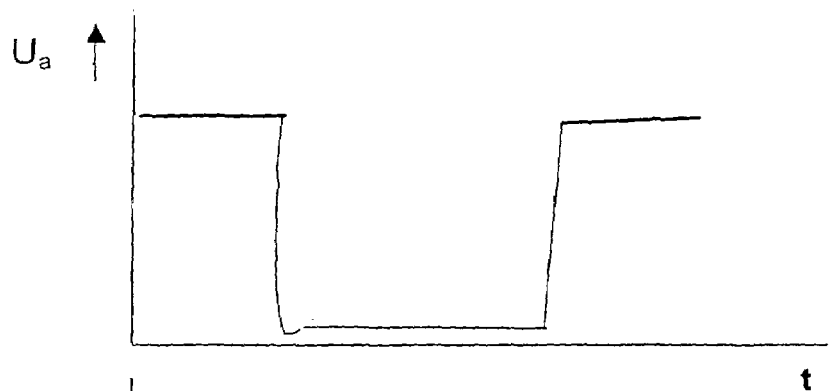
FIGS. 2 to 4 are respective graphical illustrations of simulation results for output signals of the evaluation circuit with the input lines in different symmetry states.
Figure 3:
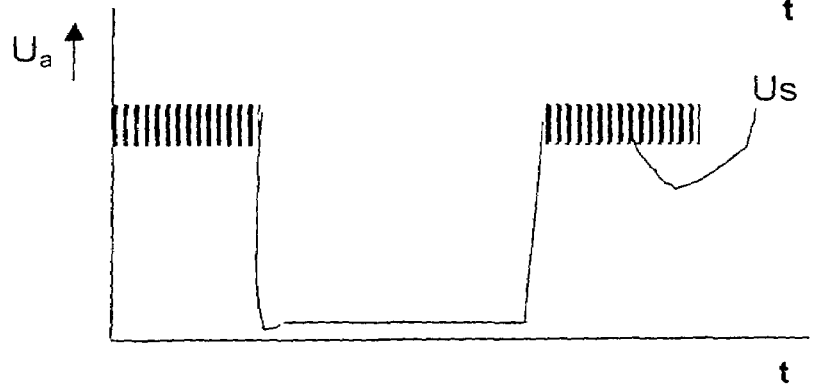
Figure 4:
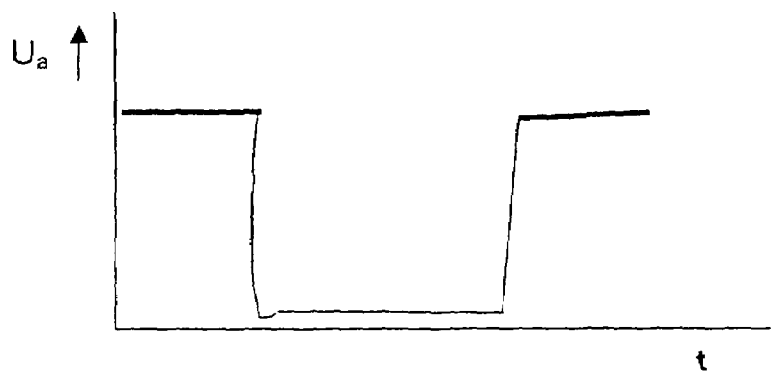

FIGS. 2 to 4 are diagrams showing operation of the sensor circuit according to FIG. 1. These diagrams are graphical illustrations of the temporal behavior of the output signal $U_a$ of the evaluation circuit 2, considering simulated capacitances and resistances on the lines with an EMV coupling. First FIG. 2 shows the behavior ($U_a$ vs. t, time) of the output signal for symmetric or matched leads at the inputs InP and InM of the evaluation circuit 2 with the stated values for $C_5$ and $C_6$ of 1.5 nF. The behavior of the output signal with a mismatch of the leads with values of 1.5 nF for $C_5$ and e.g. 2 nF for $C_6$ is shown in FIG. 3. In the case of FIG. 3 it clear that the output signal $U_a$ of the evaluation circuit is acted on with an interference signal $U_s$ produced by an EMV coupling. FIG. 4 shows a corrected signal behavior, which is obtained by switching in the switchable capacitances $C_z$ in the integrated circuit according to the invention shown in FIG. 5, which causes a correction of the signal behavior. In this simulation the capacitance values for $C_5$ were 1.5 nF+0.5 nF added by the switching in of capacitance and for $C_6$ e.g. 2 nF.

Figure 5:
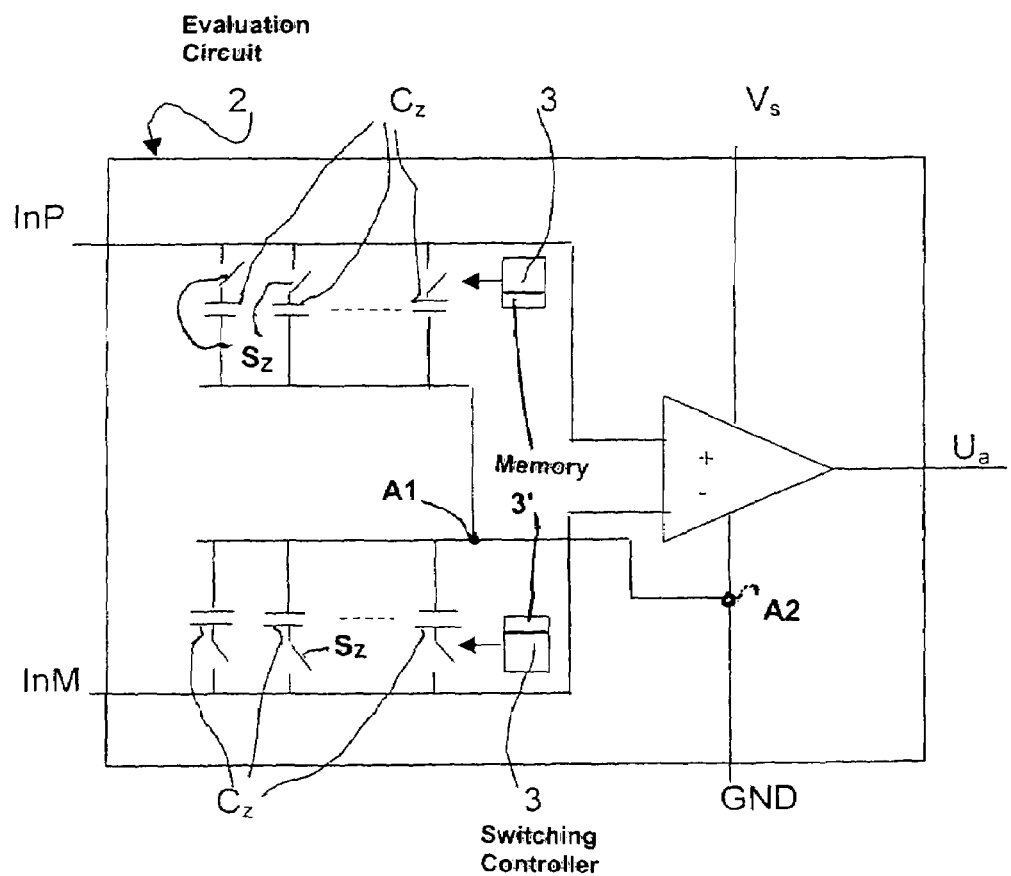
FIG. 5 is a circuit diagram showing a circuit arrangement according to the invention for switching of capacitors in the evaluation circuit.

The input circuit circuitry at each input InP and InM of the evaluation circuit 2 according to FIG. 5 has an integrated circuit comprising a bank of switchable capacitances $C_z$, which are switched into or out of connection in the integrated circuit by switches $S_z$. The integrated circuit is connected with a first terminal A1 connected with respective inputs InP, InM and with a second terminal A2 to ground GND. For compensation or balancing a common-mode signal acting as simulated EMV coupling is superposed on the measured signal from the bridge circuit of the pressure sensor 1 according to FIG. 1. Then respective combinations of the switchable capacitances $C_z$ are selected and switched into the integrated circuit connected with the corresponding inputs InP, InM by means of the switching controllers 3, so that an optimum suppression of the interfering signal in the output $U_a$ of the evaluation circuit 2 is produced.

The selected adjustment that minimizes the interference due to stray electromagnetic radiation or EMV coupling is stored in preferably non-volatile memories 3' of the switching controllers 3 as data indicating the individual ones or groups of switchable capacitances to be connected to the respective inputs InP, InM. The adjustment then can then take place automatically during each subsequent operating cycle. The coupling of the interfering signal for balancing or compensation can take place capacitively, galvanically or also by irradiation with a transmitting antenna.

On the one hand the method according to the invention can be used during development for establishing the individual capacitances, which then are used globally in production. On the other hand, calibration of each individual sensor in the production is possible. The realization of the proposed integrated input circuit for the evaluation circuit 2 occurs in such a way that a semi-automatic symmetrization of the sensor terminal lines and/or the input lines to the inputs InP, InM of the evaluation circuit 2 is achieved for minimization of the occurring voltage differences due to common-mode stray electromagnetic radiation.

The disclosure in German Patent Application 103 45 731.3-52 of Oct. 1, 2003 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method and circuit arrangement for minimizing interference in an electronic circuit, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A method for minimizing stray electromagnetic interference in an electronic circuit, in which symmetric measurement signals of a measuring bridge are evaluated, said method comprising the steps of:

conducting a bridge diagonal voltage symmetrically to both inputs ($InP_1$ InM) of an evaluating circuit (2);

providing a controllable switching arrangement in the evaluating circuit (2) for switching in switchable capacitances ($C_z$)

providing both inputs (InP, InM) of an evaluation circuit (2) with switchable capacitances ($C_z$);

applying a predetermined interference signal to said inputs (InP, InM); and switching in said switchable capacitances ($C_z$) by the controllable switching arrangement;

selecting a combination of the switchable capacitances ($C_z$) in such a way that a maximum suppression of said predetermined interference signal takes place at an output of the evaluating circuit (2); and storing a selected adjustment corresponding to the selected combination of said switchable capacitance ($C_z$) in the evaluating circuit (2).

2. The method as defined in claim 1, wherein the selected adjustment corresponding to the selected combination of said switchable capacitances ($C_z$) is stored in a memory (3) and automatically set during subsequent operating cycles.

3. The method as defined in claim 2, wherein said switching of said switchable capacitances ($C_z$) occurs one time during development of the electronic circuit.

4. The method as defined in claim 2, wherein said switching of said switchable capacitances ($C_z$) occurs after production of the electronic circuit.

5. The method as defined in claim 1, wherein a sensor device with a measuring bridge circuit (1) is provided.

6. The method as defined in claim 1, wherein the applying of the predetermined interference signal to said inputs takes place capacitively, galvanically or by means of a transmitting antenna.

7. A circuit arrangement for minimizing stray electromagnetic interference in an electronic circuit, in which symmetric measurement signals of a measuring bridge are evaluated, said circuit arrangement comprising measuring means (1) for producing a measured or sensor signal and an integrated evaluation circuit (2) for evaluation of said measured or sensor signal, said integrated evaluation circuit (2) having inputs (InP, InM) to which a bridge diagonal voltage is conducted symmetrically and predetermined interference signal is applied, said measured or sensor signal being applied to said inputs; a plurality of switchable capacitors ($C_z$); a controllable switching arrangement provided in said evaluating circuit (2) for switching said switchable capacitors individually or in groups into and out of connection with a first terminal connectable to said inputs (InP, InM) and a second terminal connected to ground with a selected combination in such a way that a maximum suppression of the predetermined interference signal takes place at an output of the evaluating circuit (2); and means for storing a selected adjustment corresponding to the selected combination of said switchable capacitances ($C_z$) in the evaluating circuit (2).

8. The circuit arrangement as defined in claim 7, wherein said controllable switching arrangement includes a switching controller (3) for switching said switchable capacitors ($C_z$) individually or in said groups, said switching controller (3) comprising means for selective switching of individual ones or said groups of said switchable capacitances for minimization of interference due to stray electromagnetic radiation.

9. The circuit arrangement as defined in claim 8, wherein said switching controller (3) includes said storing means formed as a memory (3') for storing previously determined values or data for selecting said individual ones or said groups of said switchable capacitances for minimizing said interference.

10. The circuit arrangement as defined in claim 7, wherein said measuring means comprises a Wheatstone bridge circuit and said measured or sensor signal is a bridge diagonal voltage of said Wheatstone bridge circuit.

* * * * *